United States Patent
Aisu et al.

(10) Patent No.: US 10,389,118 B2
(45) Date of Patent: Aug. 20, 2019

(54) POWER DEMAND AND SUPPLY CONTROL APPARATUS AND METHOD THEREOF

(71) Applicant: KABUSHIKI KAISHA TOSHIBA, Minato-ku (JP)

(72) Inventors: Hideyuki Aisu, Kawasaki (JP); Tomoshi Otsuki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 420 days.

(21) Appl. No.: 15/068,773

(22) Filed: Mar. 14, 2016

(65) Prior Publication Data

US 2016/0197474 A1 Jul. 7, 2016

Related U.S. Application Data

(63) Continuation of application No. PCT/JP2014/075758, filed on Sep. 19, 2014.

(30) Foreign Application Priority Data

Sep. 20, 2013 (JP) .................. 2013-196131

(51) Int. Cl.
*H02J 3/00* (2006.01)
*H02J 3/14* (2006.01)
*G05B 15/02* (2006.01)

(52) U.S. Cl.
CPC ................ *H02J 3/00* (2013.01); *G05B 15/02* (2013.01); *H02J 3/14* (2013.01);
(Continued)

(58) Field of Classification Search
CPC .......... H02J 3/00; H02J 3/14; H02J 2003/143; H02J 2003/007; G05B 15/02;
(Continued)

(56) References Cited

U.S. PATENT DOCUMENTS 8,571,720 B2   10/2013   Yonezawa et al.
8,768,527 B2    7/2014   Tomita et al.
(Continued)

FOREIGN PATENT DOCUMENTS

JP   2010-166636 A    7/2010
JP   2011-229374      11/2011
(Continued)

OTHER PUBLICATIONS

International Search Report dated Feb. 6, 2015 in PCT/JP2014/075758.

*Primary Examiner* — Kenneth M Lo
*Assistant Examiner* — David J Wynne
(74) *Attorney, Agent, or Firm* — Oblon, McClelland, Maier & Neustadt, L.L.P.

(57) ABSTRACT

A power demand and supply control apparatus includes a target value acquiring unit, an information collecting unit, an adjustment amount determining unit, and a communication unit. The acquiring unit acquires a target value of a total adjustment amount. The collecting unit collects information of registered power amount of each of the requesting targets. The determining unit determines an adjustment amount for each of the requesting targets based on the registered power amount of each of the requesting targets and the target value of the total adjustment amount. The communication unit notifies each of the requesting targets of the adjustment amount determined. The information of the registered power amount includes information of an executable time and date. The determining unit extracts a requesting target that has the executable time and date included in the power adjustment execution time and date, and determines the adjustment amount.

4 Claims, 7 Drawing Sheets

(52) U.S. Cl.
CPC ... *H02J 2003/007* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
CPC . Y04S 20/242; Y04S 20/222; Y02B 70/3225; Y02B 70/3266
See application file for complete search history.

(56) References Cited

U.S. PATENT DOCUMENTS

| | | | |
|---|---|---|---|
| 8,983,671 | B2 | 3/2015 | Yonezawa |
| 8,989,911 | B2 | 3/2015 | Murai et al. |
| 9,197,067 | B2 | 11/2015 | Otsuki et al. |
| 2011/0258018 | A1 | 10/2011 | Tyagi et al. |
| 2011/0282505 | A1* | 11/2011 | Tomita ................. H02J 3/14 700/291 |
| 2012/0065793 | A1 | 3/2012 | Kaji |
| 2012/0245752 | A1* | 9/2012 | Borrett ................. G06Q 10/06 700/295 |
| 2013/0123996 | A1 | 5/2013 | Matos |
| 2013/0231790 | A1* | 9/2013 | Shao ..................... G06Q 10/10 700/291 |
| 2014/0336836 | A1 | 11/2014 | Borrett et al. |
| 2014/0343983 | A1* | 11/2014 | Narayan ................ G06Q 10/04 705/7.12 |

FOREIGN PATENT DOCUMENTS

| | | |
|---|---|---|
| JP | 2011-234558 | 11/2011 |
| JP | 2012-38295 A | 2/2012 |
| JP | 2012-60789 A | 3/2012 |
| JP | 2012-165513 A | 8/2012 |
| JP | 5101675 B2 | 12/2012 |
| JP | 2013-9565 A | 1/2013 |
| JP | 2013-74692 A | 4/2013 |
| WO | WO 2011/105070 A1 | 9/2011 |

* cited by examiner

| CUSTOMER ID | CUSTOMER 1 | |
|---|---|---|
| EQUIPMENT ID | EQUIPMENT (1,1) | EQUIPMENT (1,2) |
| EQUIPMENT TYPE | AIR-CONDITIONER | STORAGE BATTERY |
| ADJUSTABLE CAPACITY INFORMATION | | |
| COST PER RESPONSE | 50 | 250 |
| EXECUTABLE TIME AND DATE | 15:00-19:00 ON AUGUST 1 | 13:00-19:00 ON AUGUST 1 |
| MAXIMUM ADJUSTMENT AMOUNT (kWh) | 300/300 | 400/400 |
| TOTAL ADJUSTMENT AMOUNT (kWh) | 1200 | 400 |
| TOTAL RESPONDING TIME (h) | 2 | 3 |

FIG. 3

| TIME ZONE | USING AMOUNT (kWh) |
|---|---|
| 7:00-8:00 | 307 |
| 8:00-9:00 | 303.97 |
| 9:00-10:00 | 267.83 |
| 10:00-11:00 | 296.75 |
| 11:00-12:00 | 292.78 |
| 12:00-13:00 | 274.27 |
| 13:00-14:00 | 279.56 |
| 14:00-15:00 | 266.58 |
| 15:00-16:00 | 267.36 |
| 16:00-17:00 | 281.26 |
| 17:00-18:00 | 297.82 |
| 18:00-19:00 | 274.3 |

FIG. 4

| CUSTOMER ID | CUSTOMER 1 | | CUSTOMER 2 | ... | TOTAL AMOUNT |
|---|---|---|---|---|---|
| EQUIPMENT ID | EQUIPMENT (1,1) | EQUIPMENT (1,2) | EQUIPMENT (2,1) | ... | - |
| EQUIPMENT TYPE | AIR-CONDITIONER | STORAGE BATTERY | HEAT STORAGE TANK | ... | - |
| DR PLAN (kWh) | | | | | |
| 7:00-8:00 | 0 | 0 | 0 | ... | 0 |
| 8:00-9:00 | 0 | 0 | 0 | ... | 0 |
| 9:00-10:00 | 0 | 0 | 0 | ... | 0 |
| 10:00-11:00 | 0 | 200 | 0 | ... | 200 |
| 11:00-12:00 | 150 | 50 | 0 | ... | 200 |
| 12:00-13:00 | 150 | 50 | 0 | ... | 200 |
| 13:00-14:00 | 0 | 100 | 100 | ... | 200 |
| 14:00-15:00 | ... | ... | ... | ... | ... |
| ... | | | | | |

FIG. 7

POWER DEMAND AND SUPPLY CONTROL APPARATUS AND METHOD THEREOF

CROSS REFERENCE TO RELATED APPLICATION(S)

This application is based upon and claims the benefit of priority from the prior Japanese Patent Application No. 2013-196131, filed on Sep. 20, 2013, the entire contents of which are incorporated herein by reference.

FIELD

Embodiments described herein relate generally to a power demand and supply control apparatus and method thereof.

BACKGROUND

A technology of Demand Response (hereinafter referred to as "DR") has been proposed as a technology of controlling balance between demand and supply of power, namely, the balance between a demanding power amount and a supplying power amount in an entire region by a power supplier or an intermediate power management company (aggregator, or the like) requesting a customer who consumes the power to adjust (reduce or increase) the demanding power amount.

According to the DR, the power supplier or the like requests power adjustment to each customer based on the demanding power amount and the supplying power amount preliminarily estimated, and executes the power adjustment upon receipt of the request. Therefore, there is a time lag generated between a time when the power supplier or the like requests the power adjustment and a time when the customer executes the power adjustment.

In the case of accurately controlling the power demand and supply balance, it is preferable that such a time lag be short; however, in the case where the power supplier or the like requests the power adjustment immediately before the execution time and date, burden on the customer may be increased, or the customer may not be able to respond to the request for the power adjustment because an energy storage device such as a stationary storage battery or a heat storage tank owned by the customer is not capable enough to respond to the request.

On the other hand, in the case where the request for the power adjustment is made too early, it is difficult to accurately control the power demand and supply balance because of fluctuations of the estimated demand before the execution time and date. Also, a time and date to execute the power adjustment convenient for the customer may change after the request for the power adjustment is made.

BRIEF DESCRIPTION OF THE DRAWINGS

FIG. 3 is a diagram illustrating an example of equipment information created by an equipment information creating unit;

FIG. 4 is a diagram illustrating an example of time-series data of a power consumption amount of each customer created by a power information collecting unit;

FIG. 7 is an example of a DR plan created by an adjustment amount determining unit.

DETAILED DESCRIPTION

Embodiments will now be explained with reference to the accompanying drawings. The present invention is not limited to the embodiments.

In one embodiment, a power demand and supply control apparatus requests power adjustment to a plurality of requesting targets before an execution time and date of the power adjustment when the power adjustment is executed. The power demand and supply control apparatus includes a target value acquiring unit, an information collecting unit, an adjustment amount determining unit, and a communication unit.

The target value acquiring unit acquires a target value of a total adjustment amount, which is a total value of an adjustment amount. The adjustment amount is a power amount requested to each of the requesting targets to execute power adjustment.

The information collecting unit collects information of registered power amount of each of the requesting targets. The registered power amount is registered as an adjustable power amount at the execution time and date.

The adjustment amount determining unit determines an adjustment amount for each of the requesting targets based on the registered power amount of each of the requesting targets and the target value of the total adjustment amount.

The communication unit notifies each of the requesting targets of the adjustment amount determined by the adjustment amount determining unit.

The information of the registered power amount of each of the requesting targets includes information of an executable time and date when each of the requesting targets can execute the power adjustment in response to the request.

The adjustment amount determining unit extracts, from among the plurality of requesting targets, a requesting target that has the executable time and date included in the power adjustment execution time and date, and determines the adjustment amount.

Figure 1:
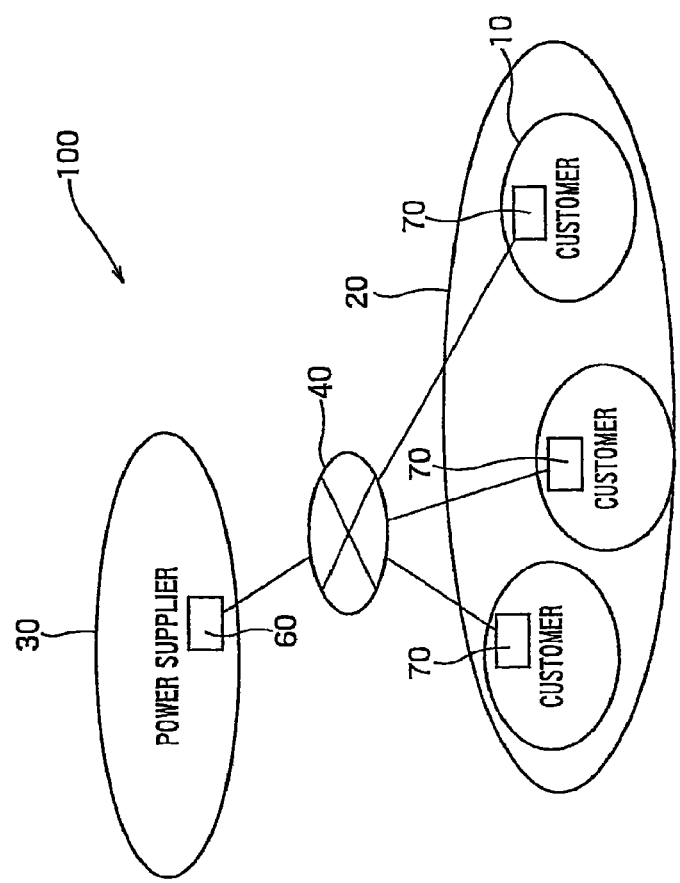
FIG. 1 is a diagram illustrating a power control system including a power demand and supply control apparatus according to an embodiment of the present invention.
Figure 2:
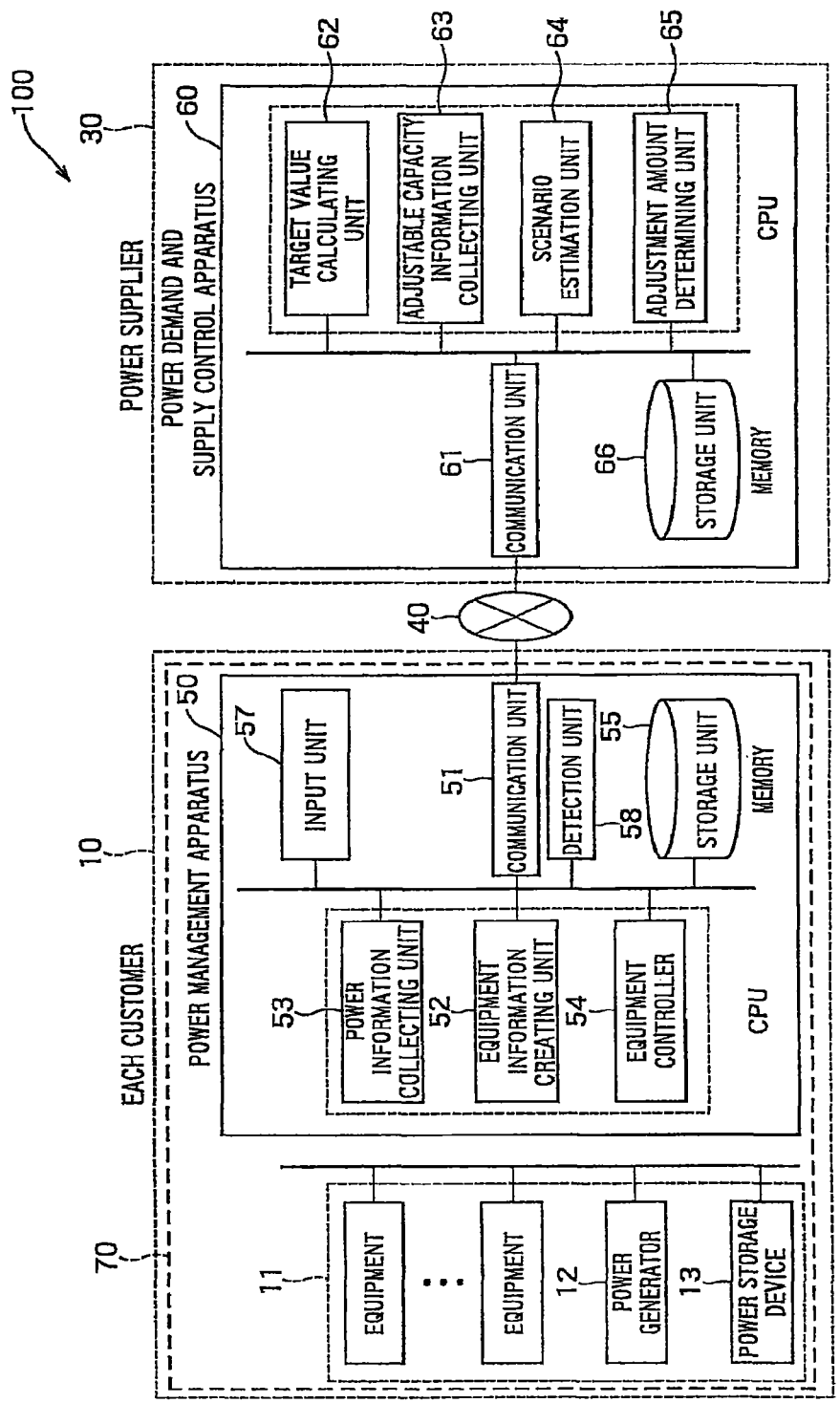
FIG. 2 is a block diagram illustrating a functional configuration of the power control system in FIG. 1.

An embodiment of the present invention will be described below with reference the drawings. Here, FIG. 1 is a schematic diagram illustrating a power demand and supply control apparatus according to the embodiment of the present invention. FIG. 2 is a block diagram illustrating a functional configuration of the power control system in FIG. 1.

A power control system 100 in FIG. 1 is divided into: a power control system 70 provided in each of a plurality of customers 10 included in a group 20; and a power demand and supply control apparatus 60 provided in a power supplier 30 which supplies power to the customers 10 belonging to the group 20. The power control system 70 provided in the customers 10 and the power demand and supply control apparatus 60 provided in the power supplier 30 are connected via a network 40 including the internet network or a power network.

Each customer 10 includes one or more electrical equipment 11 (hereinafter, simply referred to as "equipment") that consumes power, such as an air-conditioner, lighting, and a calculator. The power supplier 30 supplies power to the equipment 11 provided in each of customers 10.

The customer 10 includes, for example, a standard home and an office building, and in this case, the group 20 is a group of standard homes, office buildings, or a combination thereof. Also, examples of the power supplier 30 are a business operator that provides service from power generation to power distribution, a business operator that provides only the power distribution, or an agent that mediates between an electric power provider called aggregator and the customers.

The group 20 includes the plurality of customers 10, and each customer 10 includes at least one requesting target. The requesting target referred here represents the equipment that can adjust (reduce or increase) a demanding power amount, i.e., an amount of power to be consumed by the entire group 20. In other words, the requesting target is one or more equipment to which the power demand and supply control apparatus 60 requests the power adjustment requested. The requesting target may include each of the equipment provided in each of the customers 10. In this case, each of the customers 10 includes one or more requesting targets. On the other hand, the requesting target may include all of the equipment provided in each of the customers 10. In this case, each of the customers 10 includes one requesting target. The above-mentioned demanding power amount can be considered as a total power consumption amount consumed by all of the requesting targets included in the group 20.

In the following, a description will be given for an example in which the requesting target includes each of the equipment 11 provided in each of the customers 10. The requesting target will be simply referred to as the equipment 11.

As illustrated in FIG. 2, the customer 10 includes the power control system 70. This power control system 70 includes the equipment 11 that consumes power, and a power management apparatus 50 that controls power consumed by the equipment 11.

In FIG. 2, a plurality of the equipment 11 is included in the power control system 70. The equipment 11 consumes the power when a user belonging to the customer 10 uses the equipment 11. The customer 10 may include a power generator 12 such as a photovoltaic power system for independent power generation, or a power storage device 13 for power charging/discharging, as the equipment 11.

The power management apparatus 50 manages the consuming power of the plurality of equipment 11. The power management apparatus 50 and the equipment 11 provided in each of the customers 10 are connected by wire or radio, and the power management apparatus 50 manages the power consumption amount of the equipment 11 later described as well as information such as equipment information. Further, the power management apparatus 50 can control operation of the equipment 11 on behalf of the user and control the power consumption of the equipment 11.

The power supplier 30 includes the power demand and supply control apparatus 60 that controls a demand and supply balance of the power control system 100 as a whole. This power demand and supply control apparatus 60 creates a DR plan for controlling the demand and supply balance based on information transmitted from the power management apparatus 50 of each of the customers 10 via the network 40.

The DR plan is a concrete plan for executing power adjustment for the equipment 11 provided in each of the customers 10, and defines how much of the power and which one of equipment 11 is requested to execute the power adjustment. The DR plan contains, for example, the adjustment amount (amount to be reduced or increased) of the power consumption amount being requested to each of the equipment 11 provided in each of the customers 10. The adjustment amount is a power amount to be requested to execute power adjustment (reduce or increase) with respect to a reference value of a power consumption amount consumed for a predetermined period (time zone, for example) when equipment 11 is used. Here, in the case of requesting to reduce the power amount, the adjustment amount is to be a reduced amount, and in the case of requesting to increase the power amount, the adjustment amount is to be an increased amount, and the adjustment amount in either case is to be a positive value. Meanwhile, the reference value can be optionally set by the power supplier 30, for example, a minimum power consumption amount necessary to use the equipment 11 or an average value of past power consumption amounts of the equipment 11 when no request for power adjustment is made. Also, the reference value may be changed in accordance with the season and the time zone, and may be updated depending on the use condition.

The power demand and supply control apparatus 60 creates the DR plan before the execution time and date when the power adjustment is executed, transmits a DR signal to the power management apparatus 50 of each of the customers 10 based on the created DR plan, and requests the power adjustment to the equipment 11. The DR signal includes information in order that the power management apparatus 50 executes the power adjustment based on the created DR plan. For example, the DR signal preferably designates the adjustment amount. Also, the DR signal may include a power generation amount as the adjustment amount specified with respect to the power generator 12, or may include a power charging/discharging amount as the adjustment amount specified with respect to the power storage device 13.

In an exemplary case described below, one day is divided into 24 time zones on one hour basis, and the execution time and date when the power adjustment is executed is set during the time zones from 7:00 to 19:00. More specifically, consideration is given for the case in which the power adjustment is executed totally in 12 time zones from the time zone 7:00-8:00 to the time zone 18:00-19:00. Note that a time length of a divided time zone and the execution time and date for the power adjustment can be optionally set. For example, a day may be divided into two time zones of AM and PM, or a day may be divided into time zones on every 30 minutes basis or every 15 minutes basis. Also, the time length of the time zone does not necessarily be constant.

In the exemplary case according to the present embodiment described below, the power demand and supply control apparatus 60 creates a daily DR plan (between 7:00-19:00) at 4:00, 5:00, and 6:00 in each before starting the power adjustment. Not limited to this, the power demand and supply control apparatus 60 may create the DR plan a plurality of times at a predetermined time interval before starting the power adjustment. For example, the DR plan may be created one day before, two days before, or three days before the executing the power adjustment. The number of times and time intervals at which the power demand and supply control apparatus 60 creates the DR plan may be optionally set. Further, the power demand and supply control apparatus 60 may not create the DR plan for a day but may create the DR plan for a specific time zone. For example, the DR plan for the time zone 7:00-8:00 may be created at 4:00, 5:00, and 6:00, and the DR plan for the time zone 8:00-9:00 may be created at 5:00, 6:00, and 7:00. When the power demand and supply control apparatus 60 creates the DR plan, a DR signal based on the DR plan is transmitted to the power management apparatus 50 of all of the customers 10 included in the group 20. In the following description, note that a time when the DR plan is created to transmit the DR signal, i.e., a requesting time and date to request the power adjustment, is referred to as decision-making timing.

(Power Management Apparatus)

In the following, a functional configuration of the power management apparatus 50 will be described in detail with reference to FIG. 2. The power management apparatus 50 includes a communication unit 51 that performs data transmission and receipt with the power demand and supply control apparatus 60 via the network 40. Further, the power management apparatus 50 includes an equipment information creating unit 52, a power information collecting unit 53, an equipment controller 54, and a storage unit 55. For the equipment information creating unit 52, power information collecting unit 53, and equipment controller 54, an arithmetic processing unit such as a CPU may be used. Also, for the storage unit 55, a storage device such as a memory and a magnetic disk unit may be used.

The communication unit 51 acquires, from the storage unit 55, equipment information for each of the equipment 11 and power consumption amount information described later, and transmits the equipment information to a communication unit 61 of the power demand and supply control apparatus 60 via the network 40 at a regular time interval or in real time. Also, the communication unit 51 receives the DR signal from the communication unit 61 of the power demand and supply control apparatus 60.

The equipment information creating unit 52 creates the equipment information for each of the equipment 11 provided in the customer 10, and stores the equipment information in the storage unit 55. As illustrated in FIG. 3, the equipment information includes an equipment ID specifying the equipment 11 as next (equipment (i, k): k-th equipment provided in an i-th customer), an equipment type indicating a type of the equipment 11, and adjustable capacity information indicating capacity for responding to a request for power adjustment. The equipment information creating unit 52, for example, can assign the equipment ID to the power management apparatus 50 in the order of connecting timing when the equipment 11 is connected. Also, the equipment information creating unit 52, for example, can acquire the equipment type at the timing when the equipment 11 is connected to the power management apparatus 50. Meanwhile, in the case where the requesting target includes all of the equipment 11 provided in the customer 10, the equipment information and the adjustable capacity information are set for each of the customers 10.

According to the present embodiment, the adjustable capacity information includes a cost per response, an executable time and date, a maximum adjustment amount, a total adjustment amount, and a part or all of a total responding time; however, not limited thereto.

The cost per response is the cost for a unit power amount (1 kWh, for example) in the case of requesting the power adjustment to the equipment 11. A value obtained by multiplying the cost per response by the adjustment amount indicates a cost when the power adjustment is requested to the equipment 11. The cost referred here can be an index that indicates, for example, a price that the power supplier 30 pays the customer 10 (or the customer 10 pays the power supplier 30) in the event of the power adjustment, or a level of discomfort that customer 10 may feel due to the power adjustment. The cost per response may be optionally set by the customer 10 or the power supplier 30, and also the value can be set differently between the case where the adjustment amount is a reduced amount and the case where the adjustment amount is an increased amount.

The executable time and date is the information which indicates the time and date when the equipment 11 can execute the power adjustment. According to the present embodiment, information of the executable time and date is the information specifying a particular time and date (such as 15:00-19:00 on August 1); however, not limited thereto and may be the information specifying a time lag between the requesting time and date and the execution time and date for the power adjustment.

The maximum adjustment amount is a registered power amount P indicating a maximum value of the adjustment amount which can be adjusted (reduced for increased) by the equipment 11 based on the reference value of the power consumption amount at the above-described executable time and date. As illustrated in FIG. 3, the maximum adjustment amount includes a maximum value of the reduced amount and a maximum value of the increased amount, and indicates the amount as "maximum value of the reduced amount/maximum value of the increased amount" in an item of the maximum adjustment amount.

The total responding time indicates an upper limit value of a totalized time of each power adjustment during which the power can be continuously adjusted in response to the request for the power adjustment. In other words, the equipment 11 can execute the power adjustment only within the range of total responding time even in the executable time and date.

The total adjustment amount is a registered power amount P indicating a total maximum value of the adjustment amount per day which the equipment 11 can adjust in the above-described executable time and date. The total adjustment amount is calculated as a summed value of the adjustment amounts expressed in absolute values. That means that the amounts of the absolute values are summed without setting off the increased amount against the reduced amount even when the equipment 11 executes the power adjustment, both reducing and increasing the power during a day. For example, in the case where increase of 100 kWh and reduction of 100 kWh are executed during a day, the total adjustment amount becomes 200 kWh.

Meanwhile, the customer 10 can register the adjustable capacity information per equipment 11, for example, by using an input unit 57 such as a touch panel and also the power supplier 30 can register the adjustable capacity information per equipment 11. Further, the adjustable capacity information may be automatically updated and registered by registering specific conditions. For example, in the case of registering the conditions of the executable time and date as "7:00-19:00 on Monday", the adjustable capacity information may be automatically updated and registered as 19:00 on Monday next week at the time point when the time passes 19:00 on Monday current week.

As illustrated in FIG. 4, the power information collecting unit 53 creates time-series data of the power consumption amount of each of the customers 10 detected regularly (e.g., in basis of time zones) or in real time by the detection unit 58 such as a wattmeter, and stores in the storage unit 55. The power consumption amount of each of the customers 10 is a total value of the power consumption amounts of all of the equipment 11 provided in each of the customers 10. The power information collecting unit 53 may calculate the power consumption amount of each of the customers 10 by totalizing the power consumption amount of each of the equipment 11 detected by the detection unit 58. The above-described demanding power amount can be considered as the total amount of the power consumption amount of all of the customers 10 included in the group 20.

In the case where the customer 10 includes the power generator 12, the power consumption amount of the customer 10 is a value obtained by subtracting a power amount generated by the power generator 12 from the total value of the power consumption amounts of all of the equipment 11 excluding the power generator 12. Further, in the case where the customer 10 includes the power storage device 13, the power consumption amount of the customer 10 is a value obtained by subtracting a power amount discharged by the power storage device 13 from the total value of the power consumption amounts of all of the equipment 11 excluding the power storage device 13. Meanwhile, in the case where the power storage device 13 charges power, a power amount charged by the power storage device 13 is considered as the power consumption amount.

Additionally, in the case where the detection unit 58 cannot detect the power consumption amount of the equipment 11, or in the case where the detection unit 58 does not obtain a latest power consumption amount due to a long detection cycle for the power consumption amount of the equipment 11, the power information collecting unit 53 may be configured to estimate the power consumption amount of the equipment 11 based on past history so as to complement the information.

The equipment controller 54 controls operation of the equipment 11 such that the power consumption amount of the equipment 11 becomes close to the power amount adjusted by the adjustment amount with respect to the reference value based on the DR signal transmitted from the communication unit 51. Here, note that control of the operation of the equipment 11 corresponds to control of ON/OFF operation of the equipment 11 and control of operating conditions (such as temperature setting for an air conditioner).

In the case where a reduced amount of the power consumption amount is specified as the adjustment amount, the equipment controller 54 controls the operation of the equipment 11 such that the power consumption amount of the equipment 11 becomes close to a power consumption amount obtained by subtracting the adjustment amount (reduced amount) from the reference value. Further, in the case where an increased amount of the power consumption amount is specified as the adjustment amount, the equipment controller 54 controls the operation of the equipment 11 such that the power consumption amount of the equipment 11 becomes close to a power consumption amount obtained by adding the adjustment amount (increased amount) to the reference value.

(Power Demand and Supply Control Apparatus)

Figure 5:
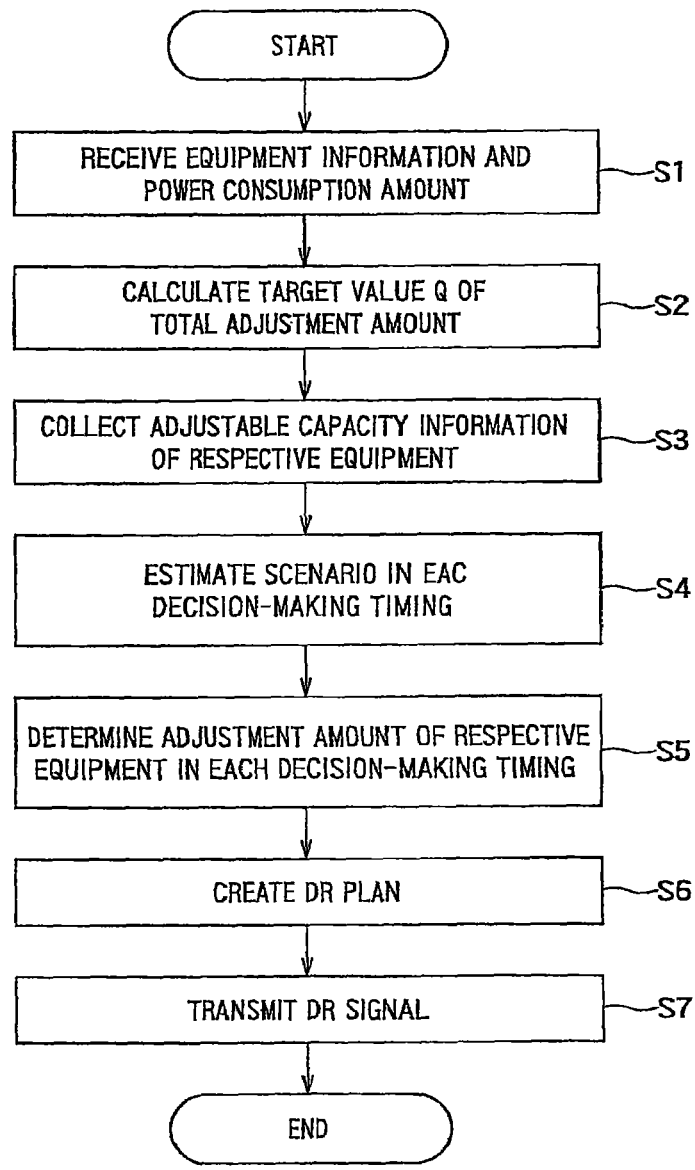
FIG. 5 is a flowchart illustrating a power demand and supply control method according to the embodiment of the present invention.

A functional configuration of the power demand and supply control apparatus 60 and a power demand and supply control method will be described below in detail with reference to FIGS. 2 and 5 to 7. Here, FIG. 5 is a diagram illustrating a flow related to the DR plan of the power demand and supply control apparatus 60 in respective decision-making timings.

The power demand and supply control apparatus 60 includes a communication unit 61 that performs transmission and receipt of data with the power management apparatus 50 via the network 40. Further, the power demand and supply control apparatus 60 includes a target value calculating unit 62, an adjustable capacity information collecting unit 63, a scenario estimation unit 64, an adjustment amount determining unit 65, and a storage unit 66. For the target value calculating unit 62, adjustable capacity information collecting unit 63, scenario estimation unit 64, and adjustment amount determining unit 65, an arithmetic processing unit such as a CPU can be used. Additionally, for the storage unit 66, a storage device such as a memory and a magnetic disk unit may be used.

The communication unit 61 receives the equipment information of each of the equipment 11, and the power consumption amount of each of the customers 10 from the communication unit 51 of the power management apparatus 50 via the network 40, and stores the information in the storage unit 66 (step S1).

The target value calculating unit 62 is a means for acquiring target value that calculates and acquires a power amount to be adjusted in the entire group 20, more specifically, a target value Q of the total adjustment amount corresponding to a value totalizing the adjustment amounts in the respective requesting targets at a DR execution time and date, to calculate the target value Q of the total adjustment amount (step S2). For example, the target value calculating unit 62 calculates the target value Q for each of the twelve time zones from 7:00 to 19:00 in which power adjustment is executed.

In order to calculate the target value Q of the total adjustment amount, the target value calculating unit 62 first calculates, based on the power consumption amount of each of the customers 10 stored in the storage unit 66, an estimation value of the demanding power amount in each of the time zones when the power adjustment is executed. The estimation value of the demanding power amount may be calculated as, for example, an average value of the demanding power amounts on the same day and at the same time in past several years of the time zones in which the power adjustment is to be executed, or an average value of the demanding power amount of plural times and dates in the past having the same weather conditions, such as an estimated temperature, of those of the time zone when the power adjustment is to be executed.

Next, the target value calculating unit 62 calculates imbalance between supply and demand which is a deviation value between the estimation value of the demanding power amount and the supplying power amount. The imbalance between supply and demand can be calculated for each of the time zones by subtracting the supplying power amount from the estimation value of the demanding power amount. In the case where the imbalance between supply and demand is a positive value, the value indicates an excessive power demand, and in the case where imbalance between supply and demand is a negative value, the value indicates an excessive power supply.

Here, the supplying power amount is a power amount scheduled to be supplied from the power supplier 30 to the group 20. According to the present embodiment, the power supplier 30 creates a daily supply plan that specifies the supplying power amount per time zone before the time zone when the power adjustment is executed (at 6:00, for example), and stores the daily supply plan for each of the time zones in the storage unit 66. The target value calculating unit 62 can calculate the imbalance between supply and demand for each of the time zones by acquiring the supply plan from the storage unit 66. Meanwhile, the target value calculating unit 62 may calculate the imbalance between supply and demand by using the supply plan received from other power supplier 30 or a higher-rank energy control system.

Further, the target value calculating unit 62 calculates the target value Q of the total adjustment amount for each of the time zones, as is necessary to resolve the imbalance between supply and demand. In the case where the imbalance between supply and demand is the positive value, the target value calculating unit 62 calculates the target value Q of the reduced amount, and in the case where the imbalance between supply and demand is the negative value, the target value calculating unit 62 calculates the target value Q of the increased amount. The target values Q of the reduced amount and increased amount can be calculated as absolute values of the imbalance between supply and demand, for example. The target value calculating unit 62 can calculate the target value Q at the timing when the supply plan is stored in the storage unit 66, for example.

Meanwhile, the means for acquiring the target value is not limited to above-described target value calculation unit 62 and may be configured to calculate and acquire the target value Q based on an estimation model of the demanding power amount estimated from, for example, tendency such as the weather conditions in the past. Also, the means for acquiring target value may be configured to acquire the target value Q from other power supplier 30 or the higher-rank energy control system.

The adjustable capacity information collecting unit 63 is a means for collecting information that collects the adjustable capacity information for each of the equipment 11 (step S3). More specifically, the adjustable capacity information collecting unit 63 collects the cost per response, executable time and date, maximum adjustment amount (registered power amount P), total adjustment amount (registered power amount P), and total responding time. The adjustable capacity information collecting unit 63 collects the above adjustable capacity information from the storage unit 66 or from the power management apparatus 50 via the communication unit 61, and stores the information in the storage unit 66. In the case where there is a change in the adjustable capacity information for each of the equipment 11, the adjustable capacity information collecting unit 63 issues a replanning trigger whereby the adjustment amount determining unit 65 is caused to replan the DR plan. The adjustment amount determining unit 65 creates a new DR plan based on the changed adjustable capacity information upon receipt of the replanning trigger.

The scenario estimation unit 64 is a means for estimating scenario that estimates transition of the registered power amount P for each of the requesting targets during a period from a present time to the execution time and date based on past transition of the registered power amount P for each of the requesting targets. The scenario estimation unit 64 estimates probable transition (scenario) of the registered power amount P for each equipment 11 at the respective decision-making timings (requesting times and dates) during a period from the present time to the execution time and date when the power adjustment is executed (step S4).

According to the present embodiment, addition and change can be optionally made on the registered power amount P of each of the equipment 11. Therefore, the registered power amount P may be varied in the respective decision-making timings. Accordingly, it is assumed that the registered power amount P of the equipment 11 stochastically transits in accordance with some typical patterns, and the transition probability of the registered power amount P in accordance with each of the patterns is estimated based on the past transition of the registered power amount P of each of the equipment 11 stored in the storage unit 66. Note that estimation of the transition probability can be achieved by using a known data mining or an estimation technology, and not particularly limited here.

Figure 6:
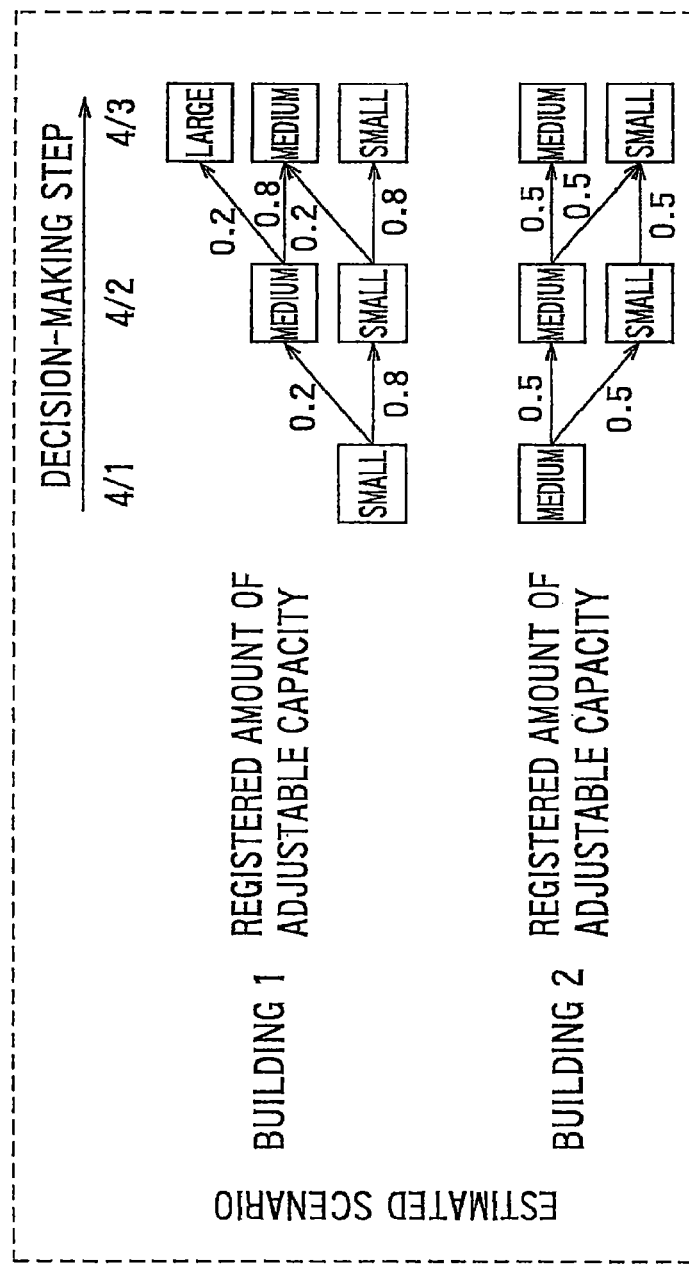
FIG. 6 is an example of a scenario estimated by a scenario estimation unit.

FIG. 6 is an example of the scenario estimated by the scenario estimation unit 64 under the above-described assumption. In FIG. 6, it is assumed that the customers 10 are only a building 1 and a building 2 each of which includes one equipment 11 (one requesting target), and the registered power amount P of each of the equipment 11 develops in following three steps: "large", "medium", and "small". Here, the registered power amount P of each of the equipment 11 is an estimation value of the registered power amount of the equipment 11 in which the power adjustment can be executed in the respective decision-making timings at the DR execution time and date. Further, there are three decision-making timings (April 1, 2, and 3) provided in total during a period from the present time (April 1) to the execution time and date. Additionally, numbers indicated near arrows in FIG. 6 represent the transition probability of the registered power amounts P in accordance with the respective patterns.

In the present (April 1) decision-making timing, the scenario estimation unit 64 acquires a current registered power amount P1 (small) from the storage unit 66 in order to estimate the transition (scenario) of the equipment 11 in the building 1. Subsequently, the scenario estimation unit 64 stochastically estimates in accordance with which one of the patterns the registered power amount P1 transits before a next decision-making timing (April 2) based on the past transition of the registered power amount P1 of the equipment 11 in the building 1. As illustrated in FIG. 6, probability that the registered power amount P1 transits in accordance with the transition pattern from "small" to "small" is estimated to be 0.8 (80%), and probability that the registered power amount P1 transits in accordance with the transition pattern from "small" to "medium" is estimated to be 0.2 (20%). In the same manner, estimation is made for the next decision-making timing (April 2). With the above processing, the transition (scenario) of the registered power amount P1 of the equipment 11 in the building 1 is estimated. The scenario estimation unit 64 estimates the transition (scenario) of the registered power amount P2 of the equipment 11 in building 2 through the same processing.

The adjustment amount determining unit 65 is a means for determining adjustment amount that determines the adjustment amount of each of the requested equipment 11 based on the transition of the registered power amount P estimated by the scenario estimation unit 64 and the transition of the target value Q of the total adjustment amount. The adjustment amount determining unit 65 determines the adjustment amount of each of the equipment 11 at the respective decision-making timings based on the scenario estimated by the scenario estimation unit 64 (step S5). Thus, the adjustment amount requested to each of the equipment 11 at the decision-making timing in the present time (April 1) is determined.

The adjustment amount determining unit 65 can determine the adjustment amount of each of the equipment 11 based on the cost per response of the equipment 11 by using a well-known optimizing technology such as dynamic programming so that a total value of an expectation value of the cost totalized for all of the decision-making timings becomes small when the request for the power adjustment is made to each of the equipment 11. In the case of using the dynamic programming, a temporally last decision-making timing 1 is selected first, and then choices of probable values of a target reduction amount remaining in the last decision-making timing 1 (for example, 100, 200, 300, or the like) are assumed based on information of the expectation value of the registered power amount at the last decision-making timing calculated based on the target reduction amount determined by the target value calculating unit 62 and the above-mentioned scenario. Then, an optimal adjustment amount is determined for respective cases. Next, in a decision-making timing 2 immediately before the last timing, choices for the probable values of the target reduction amount are assumed in the same manner as above under the precondition that the optimal adjustment amount already determined in the last decision-making timing 1 is requested. Then, an optimal adjustment amount is determined for respective cases. This step is repeated until the adjustment amount for a temporally earliest decision-making timing is determined.

The adjustment amount determining unit 65 creates the DR plan based on the adjustment amount of each of the equipment 11 in each of the time zones when the power adjustment is requested (step S6). FIG. 7 is an example of the DR plan created by the adjustment amount determining unit 65. The DR plan in FIG. 7 is an example in which the power amount of 200 (kWh) is adjusted in the entire group 20 in each of the four time zones from 11:00 and 15:00. In other words, the total adjustment amount in each of the time zones from 11:00 to 15:00 is 200 (kWh) in the DR plan in FIG. 7. In FIG. 7, an equipment (1, 1) is requested to adjust the power of the adjustment amount 150 (kWh) in each of two time zones from 12:00 to 14:00, an equipment (1, 2) is requested to adjust the power of the adjustment amounts 200, 50, 50, and 100 (kWh) in respective four time zones from 11:00 to 15:00, and an equipment (2, 1) is requested to adjust the power of the adjustment amount 100 (kWh) in a time zone from 14:00 to 15:00. The adjustment amount determining unit 65 stores the created DR plan in the storage unit 66.

The communication unit 61 acquires the DR plan from the storage unit 66 and transmits the DR signal to the communication unit 51 of the power management apparatus 50 via the network 40 (step S7).

Meanwhile, the power demand and supply control apparatus 60 performs the above-described processing from step S1 to step S7 in each of the decision-making timings. More specifically, the power demand and supply control apparatus also newly creates a DR plan and transmits the DR signal in each of the decision-making timings of 5:00 and 6:00 after transmitting the DR signal in the decision-making timing of 4:00.

As described above, the power demand and supply control apparatus 60 according to the embodiment of the present invention requests the power adjustment to each of the plurality of the equipment 11 (requesting targets) before the execution time and date when the power adjustment is executed. The power demand and supply control apparatus 60 includes the target value calculation unit 62 (means for acquiring target value) that acquires the target value Q of the total adjustment amount which is the total value of the power amount requested to each of the equipment 11 to adjust, the adjustable capacity information collecting unit 63 (means for collecting information) that collects the information of the registered power amount P of each of the equipment 11 registered as the power amount in which power adjustment can be executed at the execution time and date, the scenario estimation unit 64 (means for estimating scenario) that estimates the transition of the registered power amount P of each of the equipment 11 requested to adjust the power during a period from the requesting time and date to the execution time and date, and the adjustment amount determining unit 65 (means for determining adjustment amount) that determines the adjustment amount for each of the equipment 11 based on the transition of the registered power amount P of each of the equipment 11 and the target value Q of the total adjustment amount.

With this configuration, the power demand and supply control apparatus 60 can control the demand and supply balance in the group 20 by requesting the power adjustment within a range of the registered power amount P to each of the requesting targets in which the power can be adjusted. Consequently, the customer 10 does not need to respond to an adverse power request. Therefore, the power demand and supply control apparatus 60 can reduce burden on the customers 10.

Moreover, the power demand and supply control apparatus 60 can create the DR plan incorporating changes of the demanding power amount and supplying power amount, considering influence of factors which may stochastically fluctuate. The power demand and supply control apparatus 60 executes the power adjustment based on the DR plan, and therefore the power demand and supply control apparatus 60 can accurately control the demand and supply balance.

Note that the requesting targets in the above description are electrical equipment in which the power consumption amount can be adjusted. Such electrical equipment may include OA equipment, hot-water supply equipment, a home electrical appliances, elevators, power equipment, and so on. Also, the requesting target may be a production line in a factory capable of responding to the request for the power adjustment.

While a certain embodiment has been described, the embodiment has been presented by way of example only, and is not intended to limit the scope of the inventions. Indeed, the novel method and system described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power demand and supply control apparatus requesting power adjustment to a plurality of request targets before an execution time and date of the power adjustment when the power adjustment is executed, comprising:
   processing circuitry configured to:
   acquire a target value of a total adjustment amount, which is a total value of an adjustment amount, the adjustment amount is a power amount requested to each of the request targets to execute power adjustment;
   collect adjustable capacity registered power amount information including a cost per a unit power amount at a power adjustment request time, executable time and date of the power adjustment, maximum adjustment amount indicating a maximum value of the adjustment amount adjustable by each of the request targets, total adjustment amount indicating a total maximum value of the adjustment amount per a predetermined time period by the request targets, and a total responding time indicating an upper limit value of a totalized time of each power adjustment;
   determine an adjustment amount for each of the request targets based on the adjustable capacity registered power amount information of each of the request targets and the target value of the total adjustment amount;

notify each of the request targets of the determined adjustment amount;

estimate transition of the adjustable capacity of each of the request targets during a period from a time and date for requesting power adjustment to the execution time and date, based on past adjustable capacity registered power amount information of each of request targets;

extract, from among the plurality of request targets, a request target that has the executable time and date included in the power adjustment execution time and date; and determine the adjustment amount of each request target based on transition of the adjustable capacity of the estimated request target and transition of a target value of the total adjustment amount.

2. The power demand and supply control apparatus according to claim 1, wherein the processing circuitry further determines the adjustment amount of each of the request targets by using dynamic programming.

3. A power demand and supply control method for requesting power adjustment to a plurality of request targets before an execution time and date when power adjustment is executed, comprising:

acquiring a target value of a total adjustment amount which is a total sum of adjustment amounts corresponding to a power amount requested to each of the request targets to execute power adjustment;

collecting adjustable capacity registered power amount information including a cost per a unit power amount at a power adjustment request time, executable time and date of the power adjustment, maximum adjustment amount indicating a maximum value of the adjustment amount adjustable by each of the request targets, total adjustment amount indicating a total maximum value of the adjustment amount per a predetermined time period by the request targets, and a total responding time indicating an upper limit value of a totalized time of each power adjustment;

determining an adjustment amount for each of the request targets based on the adjustable capacity registered power amount information of each of the request targets and the target value of the total adjustment amount;

notifying each of the request targets of the determined adjustment amount; and estimating transition of the adjustable capacity of each of the request targets during a period from a time and date for requesting power adjustment to the execution time and date, based on past adjustable capacity registered power amount information of each of request targets, extracting, from among the plurality of request targets, a request target that has the executable time and date included in the power adjustment execution time and date; and determining the adjustment amount of each request target based on transition of the adjustable capacity of the estimated request target and transition of a target value of the total adjustment amount.

4. The method according to claim 3, wherein the determining determines the adjustment amount of each of the request targets by using dynamic programming.

* * * * *